(12) United States Patent
Quijano et al.

(10) Patent No.: US 9,605,792 B2
(45) Date of Patent: Mar. 28, 2017

(54) ADJUSTABLE DISPLAY MONITOR STAND

(75) Inventors: David Quijano, Fort Collins, CO (US); Owen Richard, Fort Collins, CO (US); Jonathan D Bassett, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

(21) Appl. No.: 14/342,814

(22) PCT Filed: Sep. 9, 2011

(86) PCT No.: PCT/US2011/051074
§ 371 (c)(1),
(2), (4) Date: Mar. 5, 2014

(87) PCT Pub. No.: WO2013/036245
PCT Pub. Date: Mar. 14, 2013

(65) Prior Publication Data
US 2014/0224953 A1    Aug. 14, 2014

(51) Int. Cl.
*A45D 19/04* (2006.01)
*F16M 11/04* (2006.01)
*F16M 11/20* (2006.01)
*G06F 1/16* (2006.01)

(52) U.S. Cl.
CPC ....... *F16M 11/046* (2013.01); *F16M 11/2021* (2013.01); *G06F 1/166* (2013.01); *F16M 2200/044* (2013.01); *F16M 2200/047* (2013.01)

(58) Field of Classification Search
CPC ....... F16M 11/04; F16M 11/10; F16M 11/041
USPC ... 248/122.1, 125.8, 371, 372.1, 149, 274.1, 248/309.1, 176.1
See application file for complete search history.

(56) References Cited

U.S. PATENT DOCUMENTS

| 7,021,600 B2 * | 4/2006 | Yang ..................... F16M 11/10 248/688 |
| 7,061,753 B2 | 6/2006 | Michoux et al. |
| 7,124,984 B2 | 10/2006 | Yokouchi et al. |

(Continued)

FOREIGN PATENT DOCUMENTS

| CN | 1856231 | 11/2006 |
| CN | 1992092 | 7/2007 |

(Continued)

OTHER PUBLICATIONS

EP Extended Search Report~Application No. 11871974.9-1751/2742397 dated Apr. 28, 2015~6 pages.

(Continued)

*Primary Examiner* — Todd M Epps
(74) *Attorney, Agent, or Firm* — HP Inc. Patent Department

(57) ABSTRACT

A display monitor stand device and method of operating a monitor support are disclosed. A display monitor stand may include a first support, a second support rotatably attached to the first support, and a monitor affixing part to attach to a rear face of a display monitor. The monitor affixing part may be slidably attached to the first support. The first support may include a guide track to guide the monitor affixing part in a sliding motion along one or multiple directions in which the monitor affixing part extends. The display monitor stand may include a base support rotatably attached to the first support.

14 Claims, 2 Drawing Sheets

(56) References Cited

U.S. PATENT DOCUMENTS

| | | | |
|---|---|---|---|
| 7,497,410 B2 * | 3/2009 | Lee | F16M 11/046 248/125.8 |
| 7,690,620 B2 | 4/2010 | Lee | |
| 7,717,384 B2 | 5/2010 | Kim | |
| 8,108,970 B2 * | 2/2012 | Huang | E05D 3/18 16/337 |
| 8,328,153 B2 * | 12/2012 | Yang | F16M 11/10 248/370 |
| 8,413,943 B1 * | 4/2013 | Li | F16M 11/041 248/292.12 |
| 8,467,184 B2 * | 6/2013 | Chen | G06F 1/162 361/679.55 |
| 8,651,445 B2 * | 2/2014 | Lee | A47B 23/043 248/447 |
| 8,662,465 B2 * | 3/2014 | Huang | G06F 1/203 248/176.1 |
| 2001/0055196 A1 | 12/2001 | Anzai et al. | |
| 2005/0109893 A1 | 5/2005 | Chueh et al. | |
| 2006/0238966 A1 * | 10/2006 | Sung | F16M 11/046 361/679.05 |
| 2006/0278795 A1 * | 12/2006 | Lee | F16M 11/10 248/371 |
| 2007/0193092 A1 | 8/2007 | Kim | |
| 2010/0252710 A1 | 10/2010 | Yang et al. | |

FOREIGN PATENT DOCUMENTS

| | | |
|---|---|---|
| CN | 201149774 | 11/2008 |
| CN | 101852329 | 10/2010 |
| EP | 1803987 A2 | 7/2007 |
| JP | 2004-317855 A | 11/2004 |
| JP | 2007-293913 A | 11/2007 |
| JP | 4541659 | 9/2010 |
| WO | WO-2006/112668 A1 | 10/2006 |

OTHER PUBLICATIONS

"Look! TV Easel," Apartment Therapy Unplggd, pp. 1-3, Feb. 13, 2008, Available at: <unplggd.com/unplggd/look/look-tv-easel-042759>.

PCT International Search Report and Written Opinion, International Application No. PCT/US2011/051074, Date of Mailing: Apr. 12, 2012, pp. 1-7.

* cited by examiner

ADJUSTABLE DISPLAY MONITOR STAND

BACKGROUND

Display monitor support stands may be used to support and adjust the orientation of computer display monitors, touch screen devices, television screens, all-in-one computers, and other types of devices. As display monitors become more versatile and allow for increasingly diverse user interaction, for example, touch, stylus or other input, it may be advantageous for a display monitor support stand to be more freely adjustable. A user may, for example, use a display monitor to view a video at one time and interact with a touchscreen at a different time.

Easel stands may be one type of display monitor support stand. An easel stand may resemble an upside-down V or Greek letter lambda (λ). An easel stand may contact a surface (e.g., a table, desk or other surface) at two or another number of locations. Typical easel stands may not be designed to allow a user to adjust the height of the monitor or display monitor.

BRIEF DESCRIPTION OF THE DRAWINGS

The subject matter regarded as the invention is particularly pointed out and distinctly claimed in the concluding portion of the specification. The invention, may best be understood by reference to the detailed description when read with the accompanying drawings:

Figure 1:
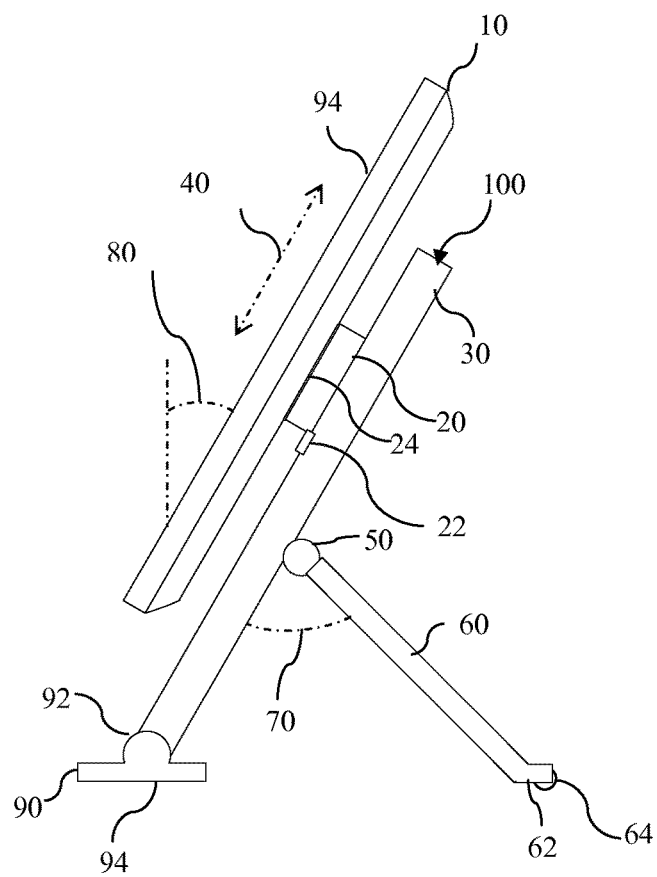
FIG. 1 is a schematic diagram of a display monitor stand according to an embodiment of the present invention.

For simplicity and clarity of illustration, elements shown in the figures have not necessarily been drawn to scale. The dimensions of some of the elements may be exaggerated relative to other elements for clarity. Further, reference numerals may be repeated among the figures to indicate corresponding or analogous elements.

DETAILED DESCRIPTION

In the following detailed description, numerous specific details are set forth in order to provide a thorough understanding of the invention. However, the present invention may be practiced without these specific details. In other instances, well-known methods, procedures, and components have not been described in detail so as not to obscure the present invention.

A display monitor stand or height adjustable easel stand may resemble a traditional easel. In one embodiment, the stand may include four major structural elements: a monitor fixed part to attach to a monitor, a first support (e.g., a lift "engine" or other part or mechanism) supporting (or connecting the stand to) the monitor and allowing the monitor to slide up and down (via the monitor fixed part), a second support or rear support (e.g., an easel foot or other part) attached by an attachment joint or hinge to the first support, and a base support or foot attached to the first support or lift engine. The "engine" or first support may provide for example spring aided pressure but typically there is no power supplied. The first support (e.g., lift engine) and second support (e.g., easel foot) may form an upside-down V, or Greek letter lambda (λ), to create a structure holding the monitor. The first support (e.g., lift engine) may be attached to the monitor fixed part such that the monitor may slide in one or more directions and, in some embodiments, rotate with respect to the first support.

A second support or rear support may be rotatably or hingedly attached to the first support and may extend away from the first support and make contact with a table, or base surface, on which the stand rests. The second support may in some embodiments be shorter than the first support. The second support or rear support may rotate with respect to the first support about their attachment joint or point. The base support or foot may be rotatably, hingedly or otherwise attached to an end of the first support that makes contact with the table. The base support may extend for example forward from the first support, but may be oriented differently. The supports may rotate with respect to each other in a plane such that, the first or front support is longer than the second or rear support piece in a direction in the plane. The monitor fixed part or connector piece may slide with respect to the front support piece in the plane. An easel stand or display monitor support stand that allows a user to adjust the height of the display stand and adjust the tilt angle of the display may be desirable and useful to a user.

An easel stand according to embodiments of the invention may be particularly useful for a display monitor with touch-screen functionality because a height adjustable easel stand may allow a user to freely adjust the height of, and possibly rotate, the display monitor for viewing, touchscreen interaction, and/or other uses. The easel stand's footprint or area(s) used on a desk, or other surface, may be adjustable to accommodate space requirements of different surfaces.

FIG. 1 is a perspective view of a display monitor stand according to an embodiment of the present invention. A display device or display monitor 10 (e.g., a computer display device, touchscreen device, all-in-one personal computer, computer display monitor, television, flat-screen television, or other device) may be attached or connected to a display monitor stand or height adjustable easel stand 100. Display monitor 10 may be affixed to a monitor affixing part 20. Monitor affixing part 20 may be, for example, a bracket, plate, sheet metal part, plastic part, or other part. Display monitor 10 may be affixed to monitor affixing part 20 using fasteners (e.g., screws, nuts, washers, or other types of fasteners), a clamp, clip, or other device. Display monitor 10 may, in some embodiments, be attached to monitor affixing part 20 using an attachment device 24 (e.g., a quick release device, plate, or other device). Monitor affixing part 20 may, in some embodiments, be (e.g., be unitary with, or include) an attachment device 24. Monitor affixing part 20 may, in some embodiments, include a hole pattern (e.g., a video electronics standards association (VESA) mounting hole pattern, a 100 mm×100 mm VESA mounting hole pattern of four holes, or other hole pattern) that matches a hole pattern, fastener pattern or other configuration of the display monitor 10. In some embodiments, the holes in display monitor 10 and/or monitor affixing part 20 may be threaded.

Display monitor affixing part 20 may be slidably attached to a first or front support 30 (e.g., using a lift engine, main support, or other mechanism). Monitor affixing part 20 may be slidably attached to first support 30 such that monitor affixing part 20 and monitor 10, which may be affixed to monitor affixing part 20, may slide with respect to first support 30. Monitor affixing part 20 may attach to a rear face of monitor 10. Monitor affixing part 20 may slide or be slidable or adjustable by a user, and then be fixed by a user (e.g., by operating a clip, clutch, clamp, button or other device) so that monitor affixing part 20 and thus monitor 10 does not move until a user moves or slides it again. Monitor affixing part 20 may slide with respect to first support 30 in order to adjust a height 40 of display monitor 10. Height 40 or other orientation of monitor 10 may, in some embodiments, be adjusted 100 mm in either direction, another distance, and/or another range of distances.

A second or rear support 60 may be rotatably or hingedly attached to first support 30 at an attachment member or joint 50. (Rear and front are relative terms, used in one embodiment only.) Second support 60 may be, for example, a plate, sheet metal part, plastic part, rubber and/or other type of part. Second support 60 may be a combination of metal plate(s), sheet metal part(s), plastic part(s), and/or other components. Second support part 60, in some embodiments, may be metal, sheet metal, plastic or other type of part with cutout(s), hole(s) or other feature(s) in (e.g. the middle of) second support part 60, such that monitor cords and other components may pass through the cutout.

A surface adhering part 62, e.g. a foot or base, may be attached to, be a component of, or otherwise be associated with second support 60. Surface adhering part 62 may contact the surface (e.g., a table, desk, television stand, the ground, or other surface) upon which display monitor stand 100 sits, rests or is otherwise located. Surface adhering part 62 may be, for example, a rubber or plastic base, series of bases, a rubber or plastic foot, series of rubber feet, or other material or part.

A roller device 64 (e.g., a wheel, set of wheels, ball, set of balls, rolling pin, or other roller device) may, in some embodiments, be attached to, be a component of, and/or otherwise be associated with second support 60 and/or surface adhering part 62. Roller device 64 may, for example, allow a user to roll display monitor stand 100 along a support surface (e.g., a table, desk, or other surface) that stand 100 rests upon. Components such as roller 64 need not be used.

Attachment joint or spring hinge joint mechanism 50 may be or may include, for example, torsion spring(s), clutch(s), notebook hinge(s), hinge(s) and/or other components. Spring hinge joint mechanism 50 may maintain an angle 70 between first support 30 and second support 60. According to one embodiment, spring hinge joint mechanism 50 may include a torsion spring to maintain an angle 70 between first support 30 and second support 60. Torsion spring may maintain angle 70 between first support 30 and second support 60 by applying a torque, couple, or other force to support 30 and support 60. According to one embodiment, attachment joint 50 may include a clutch to fix (possibly per a user operation) second support 60 and first support 30 relative to each other to maintain angle 70 between first support 30 and second support 60. Other mechanisms, devices and parts may be used to maintain angle 70 between first support 30 and second support 60.

Base support 90 may be rotatably or hingedly attached by a base attachment joint 92 to first support 30. Base support 90 may, for example, be attached to an end of first support 30, which makes contact with a support surface (e.g., a table, desk, or other surface) that stand 100 rests upon. Base support 90 may be, for example, a metal plate, sheet metal part, plastic part, rubber and/or other type of part. Base support 90 may be a combination of metal plate(s), sheet metal part(s), plastic part(s), and/or other components. Base support part 90, in some embodiments, may be sheet metal, plastic or other type of part with a cutout(s), hole(s) or other feature(s) in (e.g., the middle of) base support part 90.

A surface adhering part 94 may be attached to, be a component of, or otherwise be associated with base support 90. Surface adhering part 62 may contact the surface (e.g., a table, desk, television stand, the ground or other surface) upon which display monitor stand 100 sits, rests, or is otherwise located. Surface adhering part 94 may be, for example, a rubber base, series of rubber bases, a rubber foot, series of rubber feet, or other material or part.

Base attachment joint or base spring hinge joint mechanism 92 may be or may include, for example, torsion spring(s), clutch(s), notebook hinge(s), hinge(s), and/or other components. Base spring hinge joint mechanism 92 or a component of base attachment joint 92 may, in some embodiments, apply a torque, moment, couple, or other force to first support 30 and base support 90. The torque, moment, couple or other force may be applied such that base support 90 maintains in full or partial contact with the surface (e.g., table, desk, or other surface) that stand 100 rests upon. According to one embodiment, base attachment joint 92 may include a torsion spring to apply the torque, couple, moment, or other force to first support 30 and base support 90. According to one embodiment, base attachment joint 92 may include a clutch mechanism to provide friction in base attachment joint 92 to maintain base support 90 in full or partial contact with the surface (e.g., table, desk, or other surface) that stand 100 rests upon. Other mechanisms, devices and parts may be used to apply a torque, couple, moment or other force to first support 30 and base support 90 and/or to maintain contact between base support 90 and the surface that stand 100 rests upon. Base spring hinge joint mechanism 92 may in some embodiments be similar or equivalent to spring hinge joint mechanism 50.

According to embodiments of the present invention, angle 70 between first support 30 and second support 60 may be adjustable to accommodate different configurations of display monitor stand 100 and/or different uses of display monitor 10. By adjusting angle 70, a user may adjust an angle of display monitor 10 with respect to vertical 80. Angle with respect to vertical 80 may, in some embodiments, be adjusted between 5° tilted towards a user and 60° from vertical tilted away from a user. Other ranges may also be used. A user may, for example, adjust angle 70 to be smaller (e.g., 0 to 45 degrees (°) or another angle) if display monitor 10 is used for display uses (e.g., displaying video or other uses). A user may, in some embodiments, adjust angle 70 to be larger (e.g., 45°-180° or another angle) if display monitor 10 is used for touch, pen, stylus or other touchscreen input. A user may, in some embodiments, adjust angle 70 to be large (e.g., 180° or another angle) in order to transport display monitor stand 100 from one location to another (e.g., from home to office).

According to some embodiments, display monitor 10 and/or monitor affixing part 20 may rotate with respect to first support 30 in the plane of monitor display surface 94. A user may, for example, rotate monitor 10 in the plane of monitor surface 94 in order to change monitor 10 from landscape to portrait orientation. A user may, therefore in some embodiments, have the option to freely adjust the height of monitor 10, forward or backward tilt angle 70 and/or angle 80, and/or the landscape or portrait orientation of a monitor 10, thus, allowing a user a wide range of freedom in adjusting monitor 10 to suit their particular needs. The wide range of freedom in adjusting monitor 10 may, for example, be particularly useful for a user who frequently switches between touchscreen input based operations and keyboard input based operations. Easily and freely adjusting the orientation and height of monitor 10 may be particularly useful when two users simultaneously and/or collaboratively use touchscreen monitor 10 to, for example, play a game requiring touch screen input, control a computer based music system, or otherwise interact with touchscreen monitor 10.

Display monitor stand 100 may, in some embodiments, be adjustable to increase or decrease the footprint of stand 100 on a surface (e.g., a table, desk, chair, floor or other surface). A user may, for example, adjust angle 70 to be smaller (e.g., 0 to 45 degrees (°) or another angle) to reduce or minimize the amount of space or footprint (e.g., desk real estate) that display monitor stand 100 occupies on a desk, table, or other surface. Allowing user to freely adjust the space or footprint (e.g., desk real estate) that display monitor stand 100 occupies on a desk, table, or other surface may allow user to, for example, easily use display monitor stand 100 on multiple surfaces (e.g., on a desk at work, a cluttered kitchen table, a coffee table, or other surface(s)) throughout the day.

Figure 2:
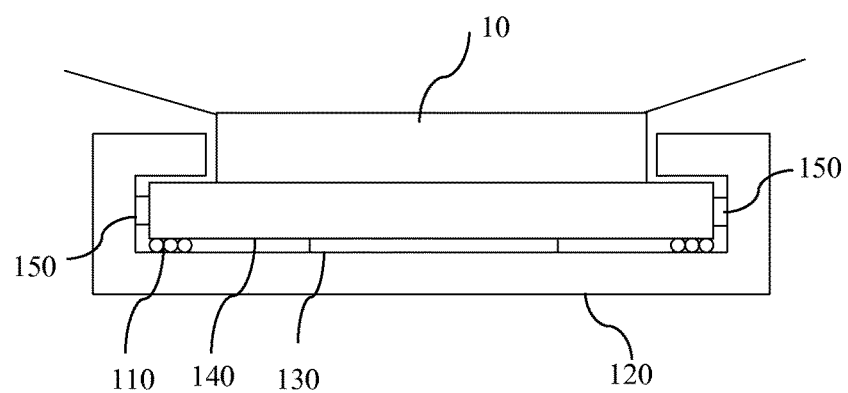
FIG. 2 is a cross-section view of the attachment between the monitor affixing part and first support according to an embodiment of the present invention.

FIG. 2 is a cross-section view of the attachment between monitor affixing part 20 and first support 30. The attachment between monitor affixing part 20 and first support 30 may include, for example, sliding bracket or part 140 (e.g., monitor affixing part 20), guide track and/or rail 120, a spring mechanism, channel, grooved part, bearings, ball bearings 110, lubricant, or other type of slidable attachment components. Sliding bracket 140 (e.g., monitor affixing part 20), in some embodiments, may slide within guide track and/or rails 120. Guide track or rails 120 may guide the monitor affixing part 20 in a sliding motion along one or multiple directions in which the monitor affixing part 20 may extend. Guide track or rail(s) 120 may be a component of first support 30. Monitor affixing part 20 may, in some embodiments, include guide track features that mate with, function with, or otherwise interact with guide track 120 or other features of first support 30. First support 30 may include ball bearings 110, plastic 130 or other parts and/or surface coatings to reduce or increase friction in sliding monitor affixing part 20 with respect first support 30. Monitor affixing part 20 may, in some embodiments, slide and contract or compress a spring 22 (e.g. a compression spring or other type of spring) or other compressible material or device. Monitor affixing part 20 may, in some embodiments, be a component of first support 30. Monitor affixing part 20 may, in some embodiments be a component of display monitor 10. A clutch, clamp or other fixing device 150, possibly operated by a user, may fix the position of monitor affixing part 20 relative to first support 30. Typically, monitor affixing part 20 is fixed to monitor 10 (but in some embodiments monitor affixing part 20 and monitor 10 may rotate relative to each other).

Figure 3:
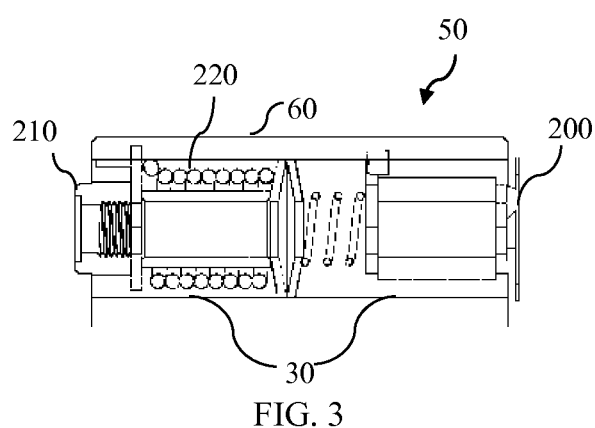
FIG. 3 is a cross-section view of the attachment between the first support and second according to an embodiment of the present invention.

FIG. 3 is a cross-sectional view of an attachment between a first support and second support according to an embodiment of the present invention. Attachment joint or spring hinge joint mechanism 50 may be a rotatable or hingeable joint. According to some embodiments, spring hinge joint mechanism 50 may include a fastener 200 (e.g., a screw, bolt, pin, or other type of fastener). Fastener 200 and nut 210 (e.g., hexagon nut, steel nut, plastic nut or other type of nut or fastener) may rotatably attach first support 30 to second support 60. A torsion spring 220 may resist rotation in attachment joint 50 (e.g., rotation of first support 30 with respect to second support 60). Torsion spring 220 may apply a torque, couple, and/or force to first support 30 and/or second support 60 to maintain an angle 70 between first support 30 and second support 60. Torsion spring 220 may apply a pre-determined force, couple and/or torque to first support 30 and/or second support 60. The torsion spring 220, by applying a force, couple, and/or torque to first support 30 and/or second support 60, may, in some embodiments, fix the position of first support 30 relative to second support 60. A clutch or clamp mechanism or other mechanism or device may, in some embodiments, fix the position of first support 30 relative to second support 60.

Torsion spring 220 over the life of stand 100 may deform and otherwise degrade in strength, stiffness, and other mechanical properties. Torsion spring may, therefore in some embodiments, be adjustable over time to increase or decrease the torque, couple, torsion and/or force applied to attachment joint 50.

Base spring hinge joint mechanism 92 may, in some embodiments, be similar or equivalent to spring hinge joint mechanism 50 shown in FIG. 3. FIG. 3 may, therefore in some embodiments, show a cross-section view of hinge joint mechanism 92, which attaches first support 30 to base support 90.

Figure 4:
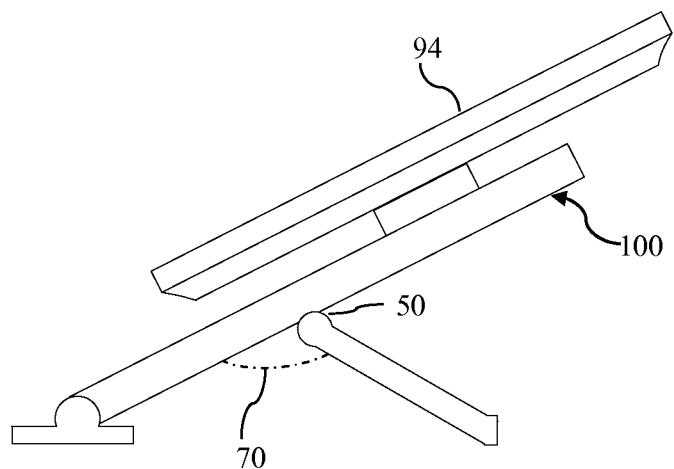
FIG. 4 is a schematic diagram of display monitor stand according to an embodiment of the present invention.

FIG. 4 is a perspective view of a display monitor stand 100 according to an embodiment of the present invention. FIG. 4 may schematically represent a display monitor stand 100 in a configuration for use with, for example, touchscreen input. A user may, for example, adjust angle 70 to an angle of 90° or greater when using display monitor stand 100 in a touchscreen configuration. When using display monitor 10 as a touchscreen, a user may, for example, apply input with a finger, stylus, pen or other type of input by applying a force to the face of monitor 94. In order to maintain angle 70 between first support 30 and second support 60, attachment joint 50 may resist the force applied by user. Attachment joint 50 may resist forces below a predefined threshold, such that angle 70 between first support 30 and second support 60 may remain constant if a force equivalent to or less than the threshold force is applied to face of monitor 94. A torsion spring, clutch, or other mechanism within spring hinge joint mechanism 50 may resist force applied to display screen 10.

A user may operate an embodiment of the display monitor stand or support to adjust the relative angle of the front or first support 30 and second or rear support piece 60 and adjust the position of the monitor affixing part or monitor connector piece 20, or monitor 10 connected to the monitor connector piece 20, by for example sliding the monitor connector piece 20 with respect to the first or front support 30. The user may fix the monitor connector piece 20 to the front or first support 30 (e.g. using a clamp or clutch) and fix the relative position of the front or first support piece 30 and the rear or second support piece 60. The user may rotate the front support piece 30 relative to the rear support piece 60 in a plane.

Features of various embodiments discussed herein may be used with other embodiments discussed herein. The foregoing description of the embodiments of the invention has been presented for the purposes of illustration and description. It is not intended to be exhaustive or to limit the invention to the precise form disclosed. Modifications, variations, substitutions, changes, and equivalents are possible. It is, therefore, to be understood that the appended claims are intended to cover all such modifications and changes as fall within the true spirit of the invention.

What is claimed is:

1. A display monitor stand comprising:
   a first support;
   a second support rotatably attached to the first support at a point midway along the first support;
   a base support rotatably attached to the first support;

a first surface adhering part affixed to the base support;
a second surface adhering part affixed to the second support; and
a monitor affixing part to attach to a rear face of a display monitor, the monitor affixing part slidably attached to the first support,
wherein the monitor affixing part is to fix the rear face of the display monitor substantially parallel to the first support, and
wherein the first and second surface adhering parts are to frictionally engage a support surface on which the display monitor stand is to rest.

2. The display monitor stand of claim 1, wherein the first support comprises a guide track to guide the monitor affixing part in a sliding motion along multiple directions in which the monitor affixing part extends.

3. The display monitor stand of claim 1, comprising a spring hinge joint mechanism to rotatably attach the base support to the first support, wherein the spring hinge joint mechanism applies a force to the base support and the first support.

4. The display monitor stand of claim 3, wherein the spring hinge joint mechanism comprises a torsion spring.

5. The display monitor stand of claim 1, comprising a spring hinge joint mechanism to rotatably attach the second support to the first support, wherein the spring hinge joint mechanism applies a force to the second support and the first support.

6. The display monitor stand of claim 5, wherein the spring hinge joint mechanism comprises a torsion spring.

7. The display monitor stand of claim 1, comprising a monitor connected to the monitor affixing part.

8. The display monitor stand of claim 1, wherein the monitor affixing part is slidable in one direction.

9. The display monitor stand of claim 1, wherein the monitor affixing part is fixable to the first support.

10. A method for operating a monitor support, the method comprising:
placing a first surface adhering part on a support surface, the first surface adhering part to frictionally engage the support surface;
adjusting a relative angle of a front support piece and a rear support piece, the front support piece connected by a hinge to a first end of the rear support piece, wherein the front support piece and rear support piece are to rotate with respect to each other in a plane, the front support piece longer than the rear support piece in a direction in the plane and forming a shape of a lambda ($\lambda$), wherein a second end of the rear support piece is to move freely, and wherein the front support piece is coupled to the first surface adhering part and the rear support piece is coupled to a second surface adhering part;
placing the second surface adhering part on the support surface, the second surface adhering part to frictionally engage the support surface; and
adjusting a position of a monitor connected to a monitor connector piece which is slidably connected to the front support piece.

11. The method of claim 10, comprising fixing the monitor connector piece to the front support.

12. The method of claim 10, comprising fixing the position of front support piece and the rear support piece.

13. The method of claim 10, comprising rotating the front support piece relative to the rear support piece in the plane.

14. A display monitor stand comprising:
a first support to slideably couple to a rear face of a display monitor near a proximal end of the first support, wherein when coupled, the display monitor is to slide along the first support in a direction from a distal end of the first support to a proximal end of the first support, wherein the first support is to transfer display monitor weight to the distal end of the first support, and wherein the distal end of the first support is coupled to a first surface adhering part; and
a second support comprising:
a proximal end rotatably attached to the first support between the proximal and distal ends of the first support, and
a distal end coupled to a second surface adhering part,
wherein the first and second surface adhering parts are to frictionally engage a support surface on which the display monitor stand is to rest.

* * * * *